United States Patent
Barasa et al.

(10) Patent No.: US 7,299,626 B2
(45) Date of Patent: Nov. 27, 2007

(54) DPF REGENERATION MONITORING METHOD

(75) Inventors: Patrick D. Barasa, Batavia, IL (US); Timothy J. Gundrum, Wheaton, IL (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 11/217,533

(22) Filed: Sep. 1, 2005

(65) Prior Publication Data

US 2007/0044455 A1    Mar. 1, 2007

(51) Int. Cl.
*F01N 3/10* (2006.01)
(52) U.S. Cl. .......................... 60/297; 60/274; 60/276; 60/285; 60/295
(58) Field of Classification Search ............ 60/274, 60/276, 284, 285, 295, 297, 311
See application file for complete search history.

(56) References Cited

U.S. PATENT DOCUMENTS 6,722,120 B2 *  4/2004  Plote ........................ 60/276
6,779,339 B1 *  8/2004  Laroo et al. ................. 60/297
6,988,361 B2 *  1/2006  van Nieuwstadt et al. .... 60/295
7,051,520 B2 *  5/2006  Nagaoka et al. ............. 60/297
7,062,907 B2 *  6/2006  Kitahara ..................... 60/295

FOREIGN PATENT DOCUMENTS

EP     1568865 A1 *  8/2005  ................. 60/295

* cited by examiner

*Primary Examiner*—Binh Q. Tran
(74) *Attorney, Agent, or Firm*—Jeffrey P. Calfa; Gerald W. Askew

(57) ABSTRACT

A method for operating an internal combustion engine (100) and exhaust system therefor includes the step of initiating a regeneration event in a diesel particulate filter (DPF 109) (401). A first oxygen concentration (213) of a gas upstream of the DPF 109, and a second oxygen concentration (215) of the gas downstream of the DPF 109 are sensed (403) to infer a rate of combustion of material in the DPF (405) based on the difference between the first (213) and the second (215) oxygen concentrations. The rate of combustion is compared to a threshold value (409) and the regeneration event in the DPF 109 is terminated (411) if the rate of combustion is above the threshold.

11 Claims, 3 Drawing Sheets

DPF REGENERATION MONITORING METHOD

FIELD OF THE INVENTION

This invention relates to exhaust gas treatment for internal combustion engines, including but not limited to, diesel particulate filter regeneration for compression ignition engines.

BACKGROUND OF THE INVENTION

Newer diesel engines have diesel particulate filters (DPF) incorporated in their exhaust systems to filter carbon and other particulates from the exhaust gas stream. When enough particulate material has accumulated on the filter element, the DPF begins to become plugged and needs to be regenerated. Regeneration is a process whereby deposits on the filter element of the DPF are induced to combust, typically by raising the engine exhaust temperature if necessary by appropriate engine operations. The combustion event of a DPF regeneration harmlessly cleans the filter element of the DPF of deposits. The regeneration process repeats as often as necessary to maintain smooth and reliable engine operation.

In many diesel engines, an electronic control unit (ECU) controls and monitors the operation of engine components. The ECU typically sends commands various systems of the engine, including commands intended to trigger a regeneration of a DPF, under appropriate engine operating conditions. Some engine operating parameters are relayed to the ECU electronically and with the help of sensors. Usually, the ECU is capable of prematurely terminating the regeneration of a DPF if conditions suitable for safe and efficient regeneration cease to exist. One parameter of great importance to regeneration of the DPF is the rate of combustion of the deposits on the filter element during a regeneration event.

Typical engines monitor the rate of combustion of deposits in a DPF during regeneration by receiving input from temperature sensors located adjacent to a DPF. The temperature sensors are used to measure the temperature of exhaust gas exiting the DPF, and thus infer the heat released from the regenerative combustion of the deposits. Heat released during the regeneration is one indication of the rate of combustion of the deposits.

A possibility exists for damage to the DPF if combustion of the deposits on the filter of the DPF becomes uncontrollable and the internal temperature of the DPF goes above a threshold. Generally, a regeneration event may be terminated before completion if conditions conducive to an efficient regeneration cease to exist. However, controlling the elapsed time from the occurrence of uncontrolled regeneration to a premature termination is essential in preventing damage to the DPF. The sooner an uncontrolled regeneration is detected, the greater the possibility to cease the regeneration in a controlled fashion and avoid damage to the DPF.

A typical temperature sensor, such as those used to infer the rate of combustion in a DPF during a regeneration, has a response time that may not be sufficiently fast to avoid potential damage of the DPF under some conditions. A typical sensor can take up to 5 seconds before relaying a change in measured temperature. A 5 second delay may be detrimental to the ability of the ECU to terminate the regeneration when required. Another disadvantage of using temperature sensors to infer the rate of combustion in the DPF is heat absorption by the bulk mass of the DPF. Heat is absorbed by the bulk mass of the filter and surrounding casing of the DPF, thus further delaying the detected temperature increase in the exhaust gas downstream of the DPF.

Accordingly, there is a need for a faster and more reliable method of sensing a condition that may require the premature termination of a regeneration event in a DPF.

SUMMARY OF THE INVENTION

A method for operating a diesel engine and an exhaust system therefor includes the step of initiating a regeneration event in a diesel particulate filter (DPF). A first oxygen concentration of a gas upstream of the DPF and a second oxygen concentration of the gas downstream of the DPF are sensed to infer a rate of combustion of material in the DPF based on the difference between the first and the second oxygen concentrations. The rate of combustion is compared to a threshold value and the regeneration event in the DPF is terminated if the rate of combustion is above the threshold value.

A method for the regeneration of a diesel particulate filter (DPF) includes the step of monitoring an amount of oxygen consumed in the DPF after a regeneration event has started. A rate of consumption of oxygen in the DPF is calculated and a temperature of the DPF filter element is inferred. The regeneration event is terminated if the temperature of the filter element exceeds a threshold.

A method for an internal combustion engine measures a first oxygen concentration upstream and a second oxygen concentration downstream of a DPF. The exhaust gas velocity for exhaust gas passing through the DPF is determined, and a total carbon mass deposit on a filter is estimated. A temperature of the filter during a regeneration is calculated based on the first oxygen concentration, the second oxygen concentration, the exhaust gas velocity, the total carbon mass deposit, and a constant value.

DESCRIPTION OF A PREFERRED EMBODIMENT

Figure 1:
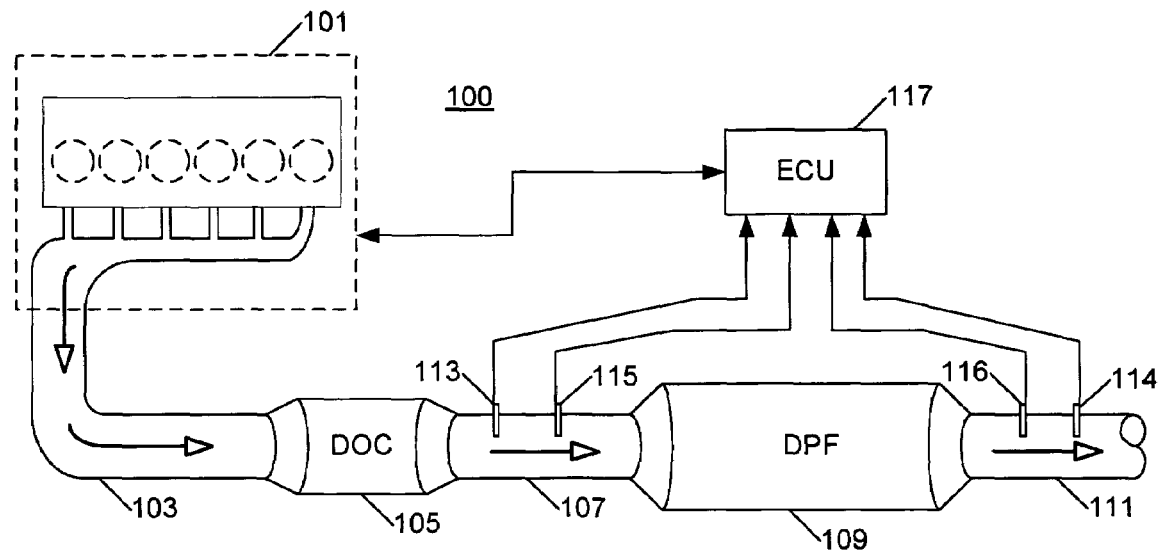
FIG. 1 is a block diagram of an engine and exhaust system made in accordance with the invention.

The following describes a method for sensing a condition that requires the premature termination of a regeneration event in a DPF including the use of oxygen sensors. A regeneration event of a DPF is an event during which solid material deposits trapped in the DPF combust to clean the DPF. Solid material trapped in the DPF includes primarily carbon, a byproduct of fuel combustion in the engine, and other materials. Oxygen sensors may be used in the intake and/or exhaust systems of an internal combustion engine to infer the rate of combustion of carbon matter accumulated on a filter element of a DPF. Based on the inferred rate of combustion, an engine ECU may be able to quickly halt the regeneration of the DPF and thus maintain a safe internal temperature in the DPF to avoid potential damage to the filter element.

An engine system 100 includes a base engine 101. The engine system 100 may include a compression ignition internal combustion or diesel engine. The base engine 101 is connected to an exhaust pipe 103 arranged to remove exhaust gas from the engine 101. A diesel oxidation catalyst (DOC) 105 is shown connected to the exhaust pipe 103, and arranged to treat exhaust gas coming from the base engine 101 for the purpose of removing oxides of Nitrogen (NOx) from the exhaust gas. A connector pipe 107 connects the DOC 105 to a diesel particulate filter (DPF) 109. On a side opposite the DOC 105, the DPF 109 has an outlet pipe 111. The outlet pipe 111 may be open to release exhaust gas to the environment, or may be connected to other components, for example a muffler (not shown). In vehicle applications, the DOC 105 and DPF 109 may be mounted to the vehicle frame (not shown) rather than to the engine 101.

Two temperature sensors are connected to the engine 101 and arranged to measure exhaust gas temperature. A first temperature sensor 113 is located preferably downstream of the DOC 105 and upstream of the DPF 109 on the connector pipe 107, and a second temperature sensor 114 is located downstream of the DPF 109 on the outlet pipe 111. Two oxygen sensors are arranged to measure exhaust gas oxygen concentration. A first oxygen sensor 115 is located preferably downstream of the DOC 105 and upstream of the DPF 109 on the connector pipe 107, and a second oxygen sensor 116 is located downstream of the DPF 109 on the outlet pipe 111. The first temperature sensor 113 and/or the first oxygen sensor 115 may alternatively be located upstream of the DOC 105.

Heat is released from an exothermic reaction between carbon deposits in the DPF 109 and oxygen in the exhaust gas. A portion of the heat released from this exothermic reaction or combustion of material during a regeneration is absorbed by the thermal mass of the DPF 109, and the remaining heat is passed on to and raises the temperature of the exhaust gas passing though the DPF 109. The absorption of heat by the DPF 109 delays the temperature rise in the exhaust gas downstream, and makes a correlation between the temperature inside the DPF 109 and the temperature of the exhaust gas exiting the DPF 109 difficult and relatively inaccurate.

Figure 2A:
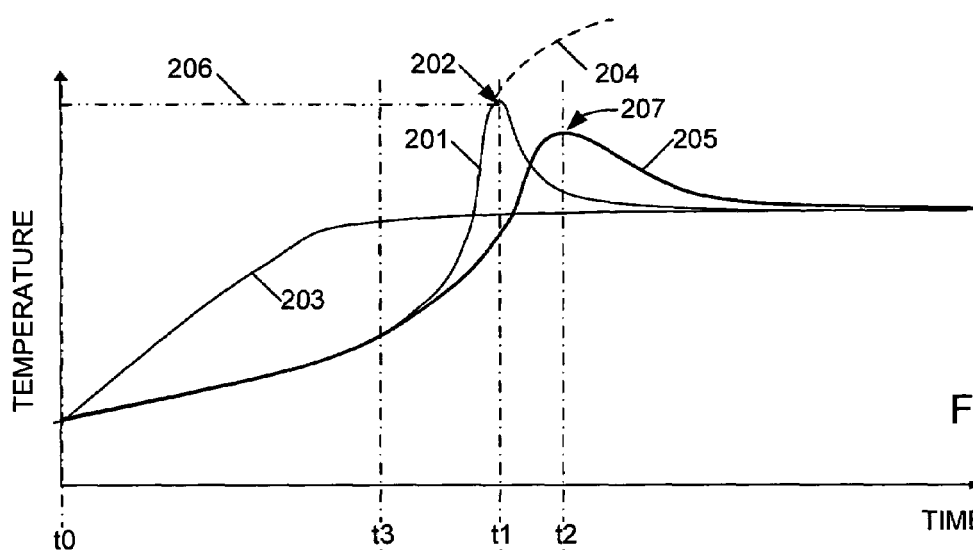
FIG. 2A-FIG. 2C are time-trace graphs of temperatures and oxygen concentrations resulting from use of the invention.

A time trace of temperature data acquired during a regeneration event of the DPF 109, representative of a typical condition, is shown in FIG. 2A. Three curves are plotted against a vertical axis representing temperature and a horizontal axis representing time. The regeneration event begins at the vertical axis or t0. A first curve 201 is a plot of an internal temperature of the DPF 109 measured by a temperature sensor (not shown) included in an experimental setup. The internal temperature of the DPF 109 rises after regeneration has begun. The first curve 201 has an inflection point 202 at a time t1. In this case, the temperature of the DPF 109 at time to has reached a threshold value 206 that depends on the material properties of the various components that make up the DPF 109. The regeneration is halted before the internal temperature of the DPF 109 rises past the threshold value 206 and causes damage to the DPF 109, such as melting of a filter element (not shown). Had the regeneration been allowed to continue, the first curve 201 would not have had the inflection point 202 and would have followed a curve 204 of increasing temperature until damage to the DPF 109 might have occurred. A second curve 203 represents a temperature of exhaust gas sensed by temperature sensor 113 upstream of the DPF 109. The sensed temperature 203 of exhaust gas upstream of the DPF 109 rises as the engine 101 prepares to trigger a regeneration event, and remains almost constant during the regeneration event. A third curve 205 represents a temperature of exhaust gas sensed by temperature sensor 114 downstream of the DPF 109.

The sensed temperature 205 of exhaust gas at the downstream sensor 114 is substantially the same as the sensed temperature 203 at the upstream sensor 113 at t0 before the regeneration begins, signaling that there is no heat added to the exhaust gas, and exhibits a slow rate of increase as the regeneration event begins. The rate of increase of exhaust gas temperature 205 downstream of the DPF 109 as compared to the rate of increase of the exhaust gas temperature upstream of the DPF 109 is slower as a result of the absorption of heat by the bulk mass of the DPF 109 that includes a shell, the filter, and other components. As time progresses, the downstream temperature 205 of exhaust gas begins to rise sharply, reaching its peak point 207 at a time t2. The sharp rise in temperature 205 of exhaust gas downstream of the DPF 109 signals the transfer of heat from the exothermic reaction in the DPF 109 to the exhaust gas at a time when the bulk mass of the DPF 109 has reached a saturation temperature. The time t2 of the peak downstream temperature 205 occurs after the DPF 109 has reached its internal temperature limit at time t1.

Figure 2B:
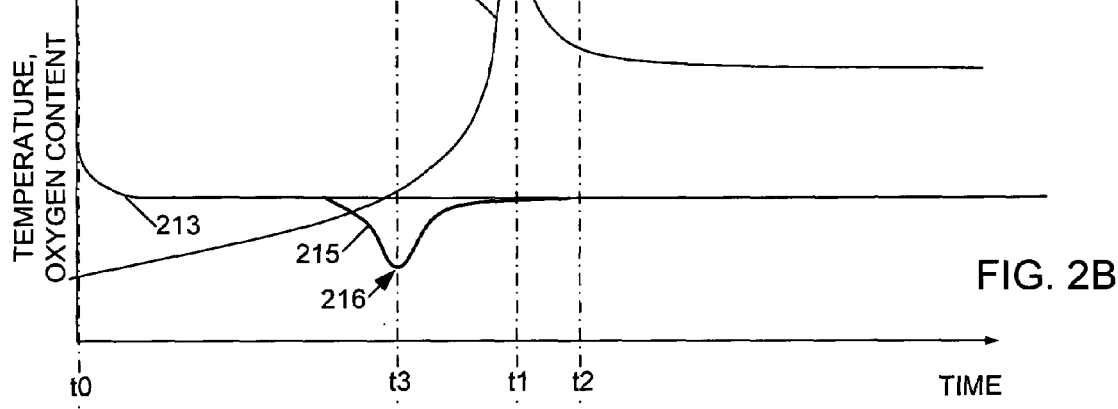

A second time trace of oxygen concentration data acquired during the same regeneration event shown in FIG. 2A is shown in FIG. 2B. The vertical axis represents both temperature and oxygen concentration for clarity, and the horizontal axis represents time. The regeneration event begins at the vertical axis or t0. The curve 201 still represents the internal temperature of the DPF 109, and is reproduced for reference. A second curve 213 represents the sensed oxygen concentration of exhaust gas by the oxygen sensor 115 upstream of the DPF 109. The sensed oxygen concentration 213 of exhaust gas upstream of the DPF 109 remains almost constant during the regeneration event. A third curve 215 represents the sensed oxygen concentration of exhaust gas by the oxygen sensor 116 downstream of the DPF 109.

The oxygen concentration 215 of exhaust gas downstream of the DPF 109 follows the oxygen concentration 213 at the inlet of the DPF 109 since the regeneration event has not begun and there is no oxygen consumed by combustion inside the DPF 109. As time progresses, the oxygen concentration 215 downstream of the DPF 109 begins to fall as oxygen is consumed by the combustion of material in the DPF 109 during the regeneration event. The curve 215 reaches a minimum at a time t3, when a maximum amount of oxygen has been consumed by the regeneration. The DPF internal temperature 201 continues to rise between the times t3 and to as heat released by the regeneration event is absorbed in the DPF 109.

In accordance with the invention, the regeneration may advantageously be prematurely halted by the engine electronic control unit at time t3, if necessary to protect the DPF 109. As may be observed from the time trace of FIG. 2B, the valley or low point 216 in the oxygen concentration of exhaust gas downstream of the DPF 109 at time t3 occurs advantageously before the DPF 109 has reached its internal temperature 201 limit at time t1.

Figure 2C:
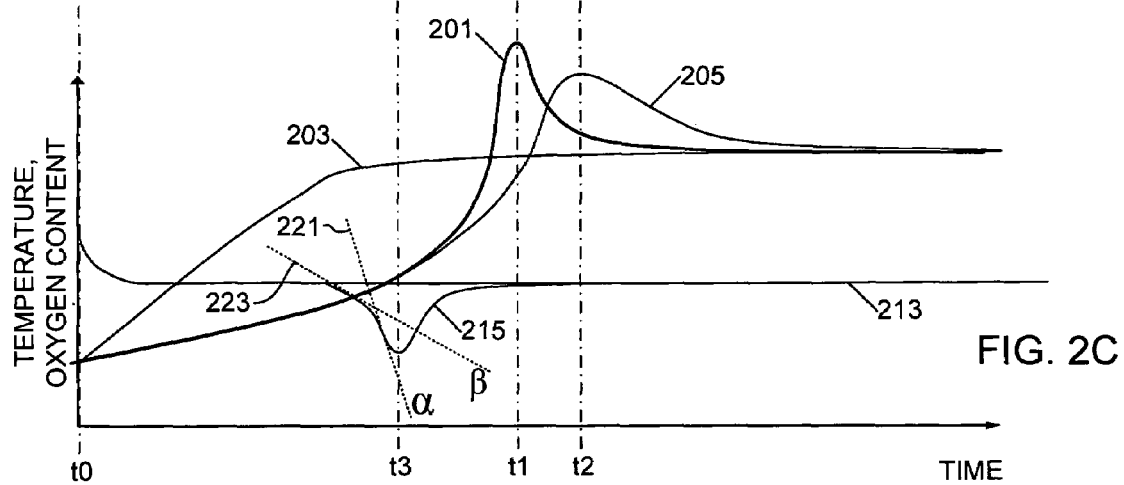

A combined time-trace is shown in FIG. 2C. Curve 215, representing the sensed oxygen concentration of exhaust gas downstream of the DPF 109, has two substantially different slopes as it descends prior to the time t3. An alpha line 221 of curve 215 corresponds to a steep slope α (alpha), and a beta line 223 of curve 215 corresponds to a shallow slope β (beta). The alpha and beta lines 221, 223, are shown tangential to the curve 215, and correspond to the trend of the curve 215 up to the inflection point that occurs at time t3. The slopes represented by the alpha and beta lines 221, 223 may be referred to as correlation tangential slopes. During a rate of decrease or slope β of the oxygen concentration downstream of the DPF 109, the regeneration event is initiating and the material deposited on the filter of the DPF 109 begins to warm-up and combust. During a rate of decrease or slope α of the oxygen concentration downstream of the DPF 109, the regeneration event has initiated and the material deposited on the filter of the DPF 109 is undergoing sustained combustion, consuming more oxygen than it did in the warm-up stage; hence, the slope α of the alpha line 221 is steeper than the slope β of the beta line 223 due to increased oxygen consumption.

Figure 3:
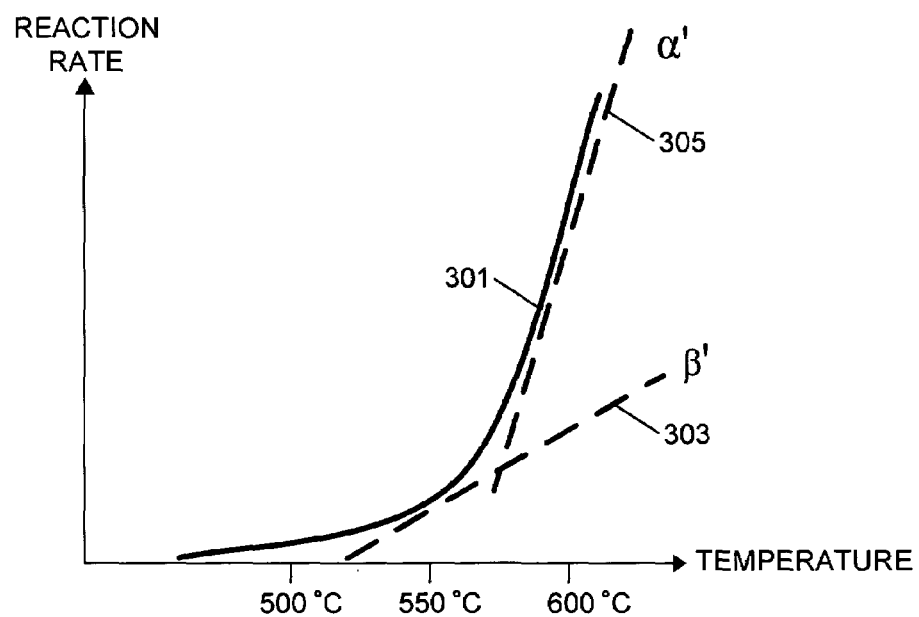
FIG. 3 is a chart illustrating the reaction rate of carbon with oxygen versus temperature.

The two slopes represented by the alpha line 221 and beta line 223, may be correlated to two main regions of combustion reaction rate between carbon and oxygen, as shown in FIG. 3. A curve 301 is plotted against temperature on the horizontal axis, and a normalized quantity representing the reaction rate between carbon and oxygen on the vertical axis. When the temperature of carbon in the presence of oxygen is warmed up from about 500 degrees C. to about 550 degrees C., it begins to warm up and combust. When the carbon is further warmed up to about 600 degrees C. and above, it begins self-sustained combustion. The curve 301 can be fit with two tangential slope lines as shown, using a beta-prime line 303, representing a first shallow slope β' of the reaction rate during the warm-up period that is correlated to the line 223 in FIG. 2C. An alpha-prime line 305, representing a second steeper slope α' of the reaction rate during the self-sustained exothermic reaction or combustion of the carbon, is correlated to the line 221 in FIG. 2C.

The slopes α' and β' respectively of the alpha-prime line 305 and the beta-prime line 303 are known for carbon, and may be experimentally approximated for a known hydrocarbon mixture that an engine produces and deposits on a DPF 109. The reaction rate for a hydrocarbon mixture depends on the concentrations of various compounds. Carbon typically is the majority concentration in such mixtures. Hence, the reaction rates of hydrocarbon mixtures are well correlated to the reaction rate of carbon. The correlation of the known reaction rate slopes for a hydrocarbon mixture to the sensed slopes of the oxygen concentration curve downstream of a DPF 109 advantageously enables the inference of the reaction rate of regeneration in the DPF 109, and more importantly, the inference of the temperature of the filter in the DPF 109. The temperature of the filter in the DPF 109 during a regeneration may be calculated using the following general mathematical expression:

$$K = \frac{dK}{dt} = \frac{O1 - O2}{\Delta t} = f(u, T, p, \varphi, C)$$

where (K) is the amount of oxygen consumed, (O1) is the oxygen concentration 215 downstream of the DPF, and (O2) is the oxygen concentration 213 upstream of the DPF. The amount of oxygen consumed (K) is a function of exhaust gas velocity (u), temperature of the filter (T), the filter bulk density (p), the filter bulk heat capacity (φ), and a total carbon content deposition on the filter (C). With appropriate sensors on the engine, and based on design parameters or other control algorithms, all factors of the function "f" are either known or can be estimated without undue experimentation. The general mathematic expression shown above may be solved to yield the temperature of the filter (T), the only unknown parameter. This calculation may advantageously be performed by an appropriate algorithm in the engine electronic control unit 117.

Figure 4:
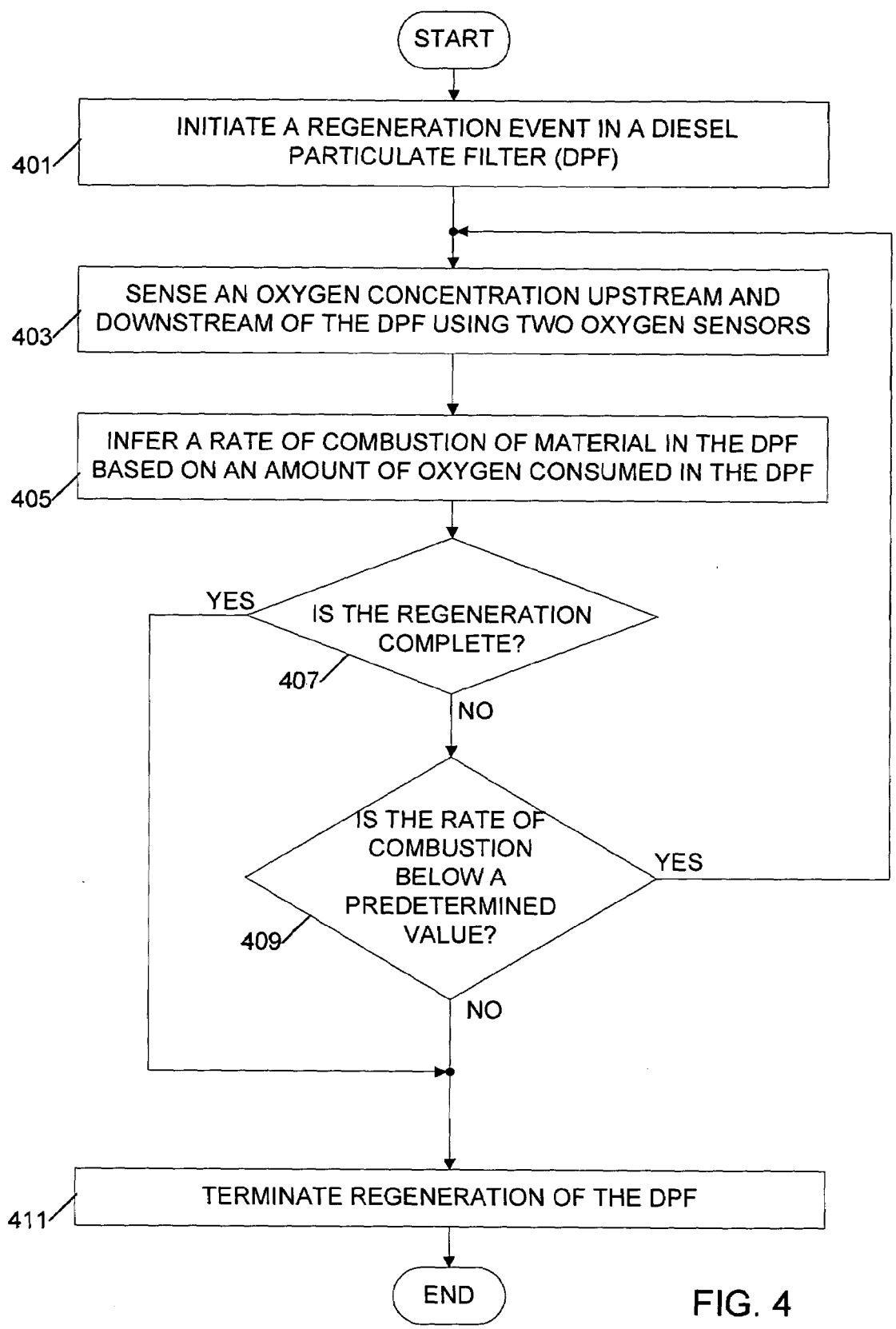
FIG. 4 is a flowchart for a method performed in accordance with the invention.

A flowchart for monitoring and, if necessary, terminating a regeneration event in a DPF 109 is presented in FIG. 4. At step 401, a regeneration event is initiated in a DPF 109 by appropriate control over engine parameters as is known in the art. In step 403, an oxygen concentration 213 is determined at a location upstream and an oxygen concentration 213 is determined at a location downstream of the DPF 109 using two oxygen sensors 115 and 116. A rate of combustion of material in the DPF 109, based on an amount of oxygen consumed in the DPF 109, is inferred in step 405. A determination of whether the regeneration is complete is made in step 407 in an electronic control unit and may depend on a number of factors including time since the regeneration commenced, a pressure difference across the DPF 109, and so forth. If the regeneration is not complete, a determination of whether the rate of combustion is below a threshold, defined, for example, by a normalized quantity representing a rate of combustion, an inferred internal temperature of the DPF 109, and so forth is made in step 409. If the rate of combustion is determined in step 409 to be beyond a threshold, or if the regeneration is determined to be completed from step 407, then the regeneration is terminated in step 411. If the rate of combustion is determined to be below the threshold in step 409, the process repeats starting with the determination of oxygen concentrations in step 403.

The problem of accurately inferring the rate of combustion in the DPF 109 during a regeneration, to sense overheating of the filter, is removed by comparing oxygen concentrations before and after the DPF 109. The amount of oxygen in the exhaust stream of an engine depends on exhaust gas velocity and oxygen concentration, and is advantageously not delayed by the thermal mass of the DPF 109. During high temperature regeneration (active regeneration), the carbon particles deposited on the filter react with oxygen in a sustainable combustion that leads to a lower oxygen concentration downstream of the DPF 109. Using various parameters to correlate the change in oxygen concentration across the DPF 109 enables the creation and use of algorithms that can be developed to detect, nearly instantaneously, the rate of regenerative combustion inside the DPF 109. A rapid response from the engine control system in case the regeneration requires termination is thus advantageously possible. In addition, feedback from the oxygen sensors can be used to control the protection method of reducing the inlet oxygen content to the DPF 109 to control the burn or combustion rate, detect the efficiency and time of completion of the regeneration event more accurately, and help reduce engine fuel consumption.

In an alternative embodiment, the first oxygen sensor 115 may be located in an intake system (not shown) of the engine 101. This alternative embodiment may use a method of inferring an oxygen concentration upstream of the DPF 109 based on the oxygen concentration at the intake of the engine 101, corrected for the oxygen consumed for combustion of fuel in a plurality of cylinders included in the base engine 101. This alternative embodiment may provide additional advantages for the engine system 100, by providing a measurement of the oxygen concentration entering the plurality of cylinders. Such a measurement may be used to infer, for example, an air-to-fuel ratio of the engine 101, the amount of exhaust gas recirculation (EGR) used by the engine 101, and so forth.

The present invention may be embodied in other specific forms without departing from its spirit or essential characteristics. The described embodiments are to be considered in all respects only as illustrative and not restrictive. The scope of the invention is, therefore, indicated by the appended claims rather than limited by the foregoing description. All changes that come within the meaning and range of equivalency of the claims are to be embraced within their scope.

What is claimed is:

1. A method comprising the steps of:
   initiating a regeneration event in a diesel particulate filter (DPF);
   sensing a first oxygen concentration of a gas upstream of the DPF, and a second oxygen concentration of the gas downstream of the DPF;
   inferring a rate of combustion of material in the DPF based on a difference between the first and the second oxygen concentrations;
   comparing the rate of combustion with a predetermined rate of combustion;
   terminating the regeneration event in the DPF if the rate of combustion is above the predetermined rate of combustion.

2. The method of claim 1, further comprising the step of determining whether the regeneration event is complete.

3. The method of claim 1, further comprising the step of repeating the sensing step if the rate of combustion is below the predetermined rate of combustion.

4. The method of claim 1, further comprising the step of calculating a gas veloclty for the gas passing through the DPF.

5. The method of claim 1, further comprising the step of estimating a loading of the DPF.

6. The method of claim 1, further comprising the step of computing a temperature of a filter disposed in the DPF.

7. A method comprising the steps of:
   sensing a first oxygen concentration upstream of a diesel particulate filter (DPF);
   sensing a second oxygen concentration downstream of the DPF;
   determining an exhaust gas velocity for exhaust gas passing through the DPF;
   estimating a total carbon mass deposit on a filter; and
   calculating a parameter of the filter based on the first oxygen concentration, the second oxygen concentration, the exhaust gas velocity, the total carbon mass deposit, and a constant value, wherein the constant value is at least one of a bulk material density of the filter and a bulk heat capacity of the filter, and wherein the calculated parameter of the filter is at least one of a temperature of the filter and a rate of combustion in the filter.

8. The method of claim 7, wherein the step of sensing a first oxygen concentration upstream of a diesel particulate filter (DPF) comprises measuring the first oxygen concentration in an exhaust system of an engine.

9. The method of claim 7, wherein the step of sensing a first oxygen concentration upstream of a diesel particulate filter (DPF) comprises measuring the first oxygen concentration in an intake system of an engine.

10. The method of claim 7, wherein the determining, estimating, and calculating steps are performed by at least one algorithm in an electronic control unit.

11. The method of claim 7, further comprising the step of comparing the calculated parameter of the filter to a threshold parameter.

* * * * *